(12) United States Patent
Thomas et al.

(10) Patent No.: US 10,370,048 B2
(45) Date of Patent: Aug. 6, 2019

(54) SUSPENSION SYSTEM FOR WORK VEHICLE

(71) Applicant: Deere & Company, Moline, IL (US)

(72) Inventors: Galen C. Thomas, Dubuque, IA (US); Steven R. Whiteman, Dubuque, IA (US); Trent A. Luoma, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 199 days.

(21) Appl. No.: 15/446,924

(22) Filed: Mar. 1, 2017

(65) Prior Publication Data

US 2018/0251171 A1 Sep. 6, 2018

(51) Int. Cl.
*B62D 55/24* (2006.01)
*B62D 55/104* (2006.01)

(52) U.S. Cl.
CPC ............ *B62D 55/104* (2013.01); *B62D 55/24* (2013.01)

(58) Field of Classification Search
CPC .......................... B62D 55/104; B62D 55/1086
See application file for complete search history.

(56) References Cited

U.S. PATENT DOCUMENTS

| | | |
|---|---|---|
| 2,616,273 A | 11/1952 | Pringle |
| 3,183,987 A | 5/1965 | Trombley |
| 3,601,424 A * | 8/1971 | Badland ............... B60G 11/225 267/258 |
| 3,687,479 A * | 8/1972 | Kober .................. B60G 11/225 267/258 |
| 4,627,885 A | 12/1986 | Arlt |
| 4,794,998 A * | 1/1989 | Iwai ..................... B62K 25/005 180/219 |

(Continued)

FOREIGN PATENT DOCUMENTS

| | | |
|---|---|---|
| EP | 2397716 | 12/2011 |
| KR | 1020080049524 | 4/2008 |

(Continued)

*Primary Examiner* — Tony H Winner
*Assistant Examiner* — Michael R Stabley
(74) *Attorney, Agent, or Firm* — Michael Best & Friedrich LLP (57) ABSTRACT

A suspension system supports a chassis relative to a crawler mechanism that includes a continuous track. A link is rotatable about an axis extending transversely through a first portion. The first portion includes a projections extending radially inwardly, and peripheral openings defined by spaces between the projections. An axle member secured to the crawler mechanism includes peripheral shafts extending radially outward from the axis and positioned in an associated peripheral opening. Each resilient member is positioned within an associated peripheral opening and engages an associated peripheral shaft, damping movement of the peripheral shaft relative to the link. The suspension system further includes an auxiliary roller assembly including a yoke and a plurality of auxiliary rollers coupled to the yoke. The yoke is rotatable relative to the crawler frame about a yoke axis. The plurality of auxiliary rollers is aligned along a direction of travel of the continuous track and is configured to engage an inner surface of the track.

13 Claims, 11 Drawing Sheets

(56) References Cited

U.S. PATENT DOCUMENTS

| | | | |
|---|---|---|---|
| 4,826,145 A * | 5/1989 | Moore | F16C 27/063 |
| | | | 267/140.4 |
| 4,966,386 A * | 10/1990 | Werdich | B60G 11/225 |
| | | | 267/276 |
| 5,263,736 A | 11/1993 | Stevens | |
| 5,277,450 A * | 1/1994 | Henschen | B60G 11/183 |
| | | | 267/276 |
| 5,316,381 A | 5/1994 | Isaacson et al. | |
| 5,531,642 A | 7/1996 | Shiomi et al. | |
| 5,788,265 A * | 8/1998 | McLaughlin | B60G 11/225 |
| | | | 280/124.169 |
| 5,997,109 A | 12/1999 | Kautsch | |
| 6,209,858 B1 | 4/2001 | Fujii | |
| 6,247,547 B1 | 6/2001 | Lemke et al. | |
| 6,371,461 B1 * | 4/2002 | Stahl | F16F 1/3863 |
| | | | 267/140.12 |
| 6,435,291 B2 | 8/2002 | Lemke et al. | |
| 6,435,292 B2 | 8/2002 | Lemke et al. | |
| 6,497,460 B2 | 12/2002 | Lemke et al. | |
| 6,877,728 B2 | 4/2005 | Gehret | |
| 7,156,474 B2 | 1/2007 | Safe et al. | |
| 7,188,915 B2 | 3/2007 | Lemke et al. | |
| 7,231,993 B2 | 6/2007 | Albright et al. | |
| 7,255,184 B2 | 8/2007 | Loegering et al. | |
| 7,404,608 B2 | 7/2008 | Plante et al. | |
| 7,552,785 B2 | 6/2009 | Tuhy | |
| 7,562,727 B1 | 7/2009 | Hoffart | |
| 7,651,173 B2 | 1/2010 | Fan et al. | |
| 7,670,228 B2 | 3/2010 | Matsumoto et al. | |
| 7,798,260 B2 | 9/2010 | Albright et al. | |
| 7,862,131 B2 | 1/2011 | Poirier | |
| 7,931,538 B2 * | 4/2011 | Martinek | F16F 15/124 |
| | | | 464/73 |
| 7,967,087 B2 | 6/2011 | Arulraja et al. | |
| 8,157,335 B2 | 4/2012 | Poirier | |
| 8,226,101 B2 * | 7/2012 | Lariviere | B60G 11/225 |
| | | | 280/124.166 |
| 8,360,179 B2 | 1/2013 | Daniels et al. | |
| 8,474,554 B2 | 7/2013 | Howe et al. | |
| 8,573,336 B2 | 11/2013 | Arulraja et al. | |
| 8,757,650 B2 * | 6/2014 | Revelino | B60G 5/01 |
| | | | 280/124.169 |
| 8,794,358 B2 | 8/2014 | Hanse | |
| 8,833,795 B2 | 9/2014 | Riedl et al. | |
| 2007/0029871 A1 | 2/2007 | Wake et al. | |
| 2008/0194345 A1 * | 8/2008 | Choi | F16F 15/12 |
| | | | 464/180 |
| 2010/0060075 A1 | 3/2010 | Hansen | |
| 2013/0087957 A1 | 4/2013 | Riedl et al. | |
| 2013/0161927 A1 | 6/2013 | Riedl et al. | |
| 2015/0166133 A1 | 6/2015 | Evenson, Sr. et al. | |
| 2017/0101143 A1 | 4/2017 | Thomas et al. | |

FOREIGN PATENT DOCUMENTS

| | | |
|---|---|---|
| KR | 1020150012404 | 2/2015 |
| KR | 101519208 | 5/2015 |
| WO | 2017039060 | 3/2017 |

* cited by examiner

SUSPENSION SYSTEM FOR WORK VEHICLE

BACKGROUND

The present disclosure relates to a suspension system for a work vehicle, and particularly to a suspension system including at least one torsional biasing member and at least one bogie roller.

A work vehicle may include a chassis supported for movement by one or more crawlers. The chassis may support an operator cab and a work attachment. Each crawler includes a continuous track driven by a drive sprocket and one or more rollers.

SUMMARY

In one aspect, a suspension system for supporting a chassis relative to a crawler frame includes a link, an axle member configured to be secured to the crawler frame, a shaft, a bearing, a seal, a plurality of resilient members, and at least one auxiliary roller assembly configured to be coupled to the crawler frame. The link includes a first portion and a second portion. The second portion is configured to be coupled to the chassis. The link is rotatable about an axis extending transversely through the first portion. The first portion includes an inner surface, a plurality of projections extending radially inward from the inner surface, and a plurality of peripheral openings defined by spaces between the plurality of projections. The axle member includes a plurality of peripheral shafts, and each of the peripheral shafts is positioned in an associated one of the peripheral openings of the first portion. Each of the peripheral shafts extends radially outwardly with respect to the axis. Rotation of the axle member relative to the link about the axis causes each peripheral shaft to rotate about the axis within the associated peripheral opening. The shaft extends along the axis at least partially between the first portion and the axle member. The bearing supports the shaft for rotation about the axis relative to at least one of the link and the axle member. The seal extends along a perimeter of at least the first portion of the link to seal the plurality of peripheral openings. Each of the resilient members is positioned within an associated one of the peripheral openings and engages an associated peripheral shaft. Each resilient member damps movement of the associated peripheral shaft relative to the link about the axis in at least a first direction. Each auxiliary roller assembly includes a yoke and a plurality of auxiliary rollers coupled to the yoke. The yoke is configured to be rotatable relative to the crawler frame about a yoke axis. The plurality of auxiliary rollers are aligned along a direction of travel of the track and configured to engage an inner surface of the track.

In another aspect, a work vehicle includes a chassis supporting an operator cab and a work attachment; a crawler mechanism for moving the chassis on a support surface, and a suspension system for supporting the chassis relative to the crawler mechanism. The crawler mechanism includes a frame, a continuous track extending around the frame, and a drive sprocket for driving the track. The frame includes a first end, a second end, and at least one idler roller engaging the track. The suspension system includes a link, an axle member secured to the crawler frame, a plurality of resilient members, and at least one auxiliary roller assembly coupled to the crawler frame between the first end and the second end. The link includes a first portion and a second portion, and the second portion is coupled to the chassis. The link is rotatable about an axis extending transversely through the first portion. The first portion includes an inner surface, a plurality of projections extending radially inward from the inner surface, and a plurality of peripheral openings defined by spaces between the plurality of projections. The axle member is secured to the crawler frame and includes a plurality of peripheral shafts. Each of the peripheral shafts extends radially outward from the axis and is positioned in an associated one of the peripheral openings of the first portion of the link. Rotation of the axle member relative to the link about the axis causes each peripheral shaft to rotate about the axis within the associated peripheral opening. Each of the resilient members is positioned within an associated one of the peripheral openings and engages an associated peripheral shaft. Each resilient member damps movement of the associated peripheral shaft relative to the link about the axis in at least a first direction. Each auxiliary roller assembly includes a yoke and a plurality of auxiliary rollers coupled to the yoke. The plurality of auxiliary rollers is aligned along a direction of travel of the track and engages an inner surface of the track. Each of the auxiliary rollers is supported for rotation relative to the yoke about a roller axis.

In yet another aspect, a suspension system is provided for supporting a chassis relative to a crawler mechanism including a continuous track. The suspension system includes a link, an axle member configured to be secured to the crawler mechanism, and a plurality of resilient members. The link includes a first portion and a second portion, and the second portion is configured to be coupled to the chassis. The link is rotatable about an axis extending transversely through the first portion. The first portion includes an inner peripheral surface, a plurality of projections extending radially inward from the inner surface, and a plurality of peripheral openings defined by spaces between the plurality of projections. The axle member includes a plurality of peripheral shafts. Each of the peripheral shafts extends radially outward from the axis and is positioned in an associated one of the peripheral openings of the first portion. Rotation of the axle member relative to the link about the axis causes each peripheral shaft to rotate about the axis within the associated peripheral opening. Each of the resilient members is positioned within an associated one of the peripheral openings and engages an associated peripheral shaft. Each resilient member damps movement of the associated peripheral shaft relative to the link about the axis in at least a first direction. The suspension system further includes at least one auxiliary roller assembly supported for pivoting movement relative to the crawler mechanism. Each auxiliary roller assembly includes a yoke and a plurality of auxiliary rollers coupled to the yoke. The yoke is configured to be rotatable relative to the crawler frame about a yoke axis. The plurality of auxiliary rollers is aligned along a direction of travel of the continuous track and is configured to engage an inner surface of the track.

Other aspects will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

Figure 1:
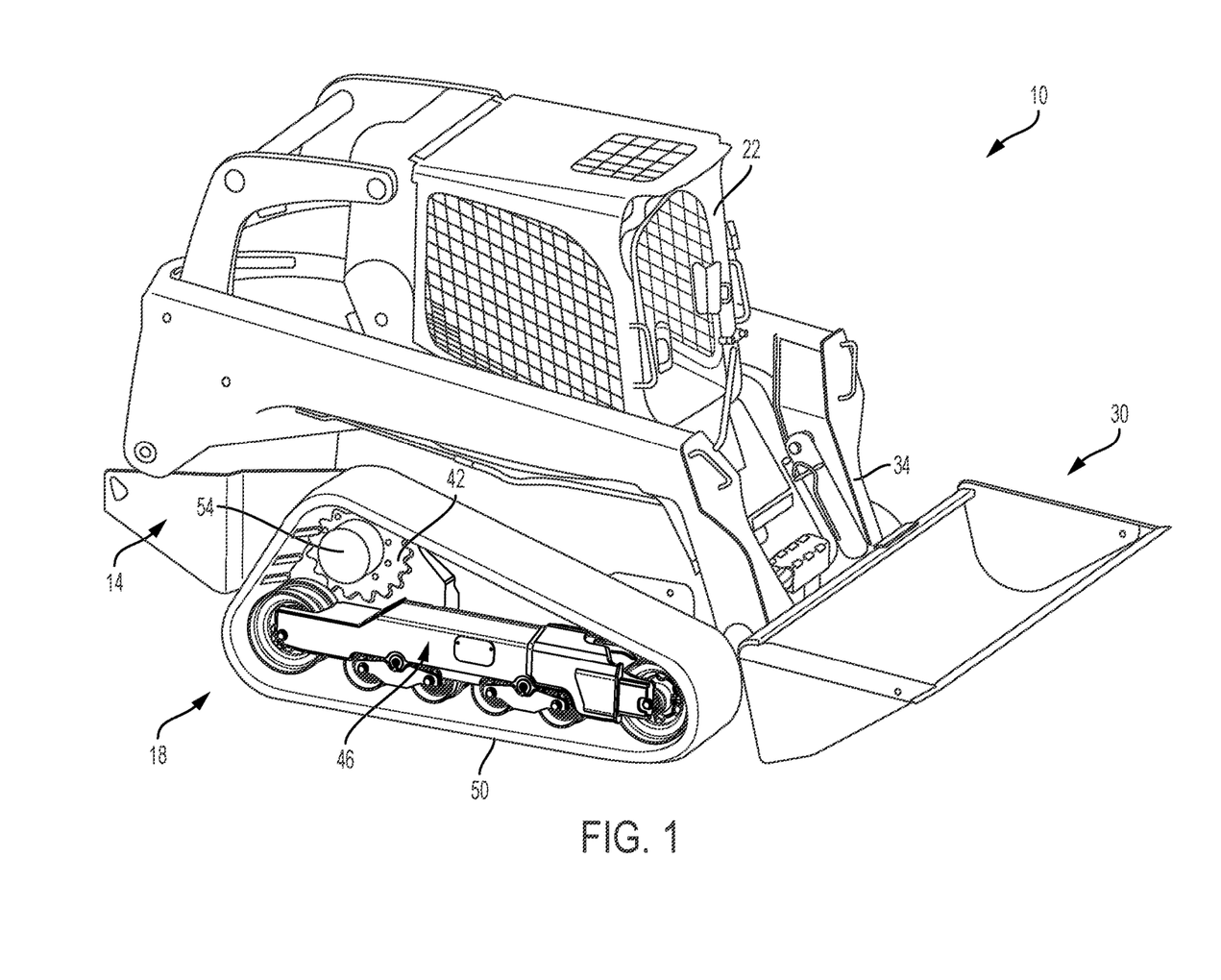
FIG. 1 is a perspective view of a work vehicle.

FIG. 1 illustrates a work vehicle, such as a compact track loader 10, including a chassis 14 and traction members (e.g., crawler mechanisms 18) for supporting and propelling the chassis 14 along a surface. The vehicle 10 further includes an operator cab 22 and a tool or work attachment (e.g., a bucket 30) supported on an end of an arm 34. In the illustrated embodiment, each crawler mechanism 18 includes a drive sprocket 42, an undercarriage frame 46 coupled to the chassis 14, and a track 50. The drive sprocket 42 is driven by a motor 54 and engages the track 50. The track 50 is driven in an endless loop around the drive sprocket 42 and the undercarriage frame 46.

Although the work vehicle 10 is illustrated and described as a loader, it is understood that the work vehicle may have a different form, such as an excavator, a dozer, a motor grader, a scraper, or another type of construction, mining, agricultural, or utility machine. Also, although the work attachment is illustrated and described as a bucket, it is understood that the work attachment may have a different form, such as an auger, a breaker, a ripper, a grapple, or some other type of attachment for digging, breaking, handling, carrying, dumping or otherwise engaging dirt or other material. In addition, the work attachment may be detachable from the arm 34 to permit another type of work attachment to be coupled to the arm 34.

Figure 2:
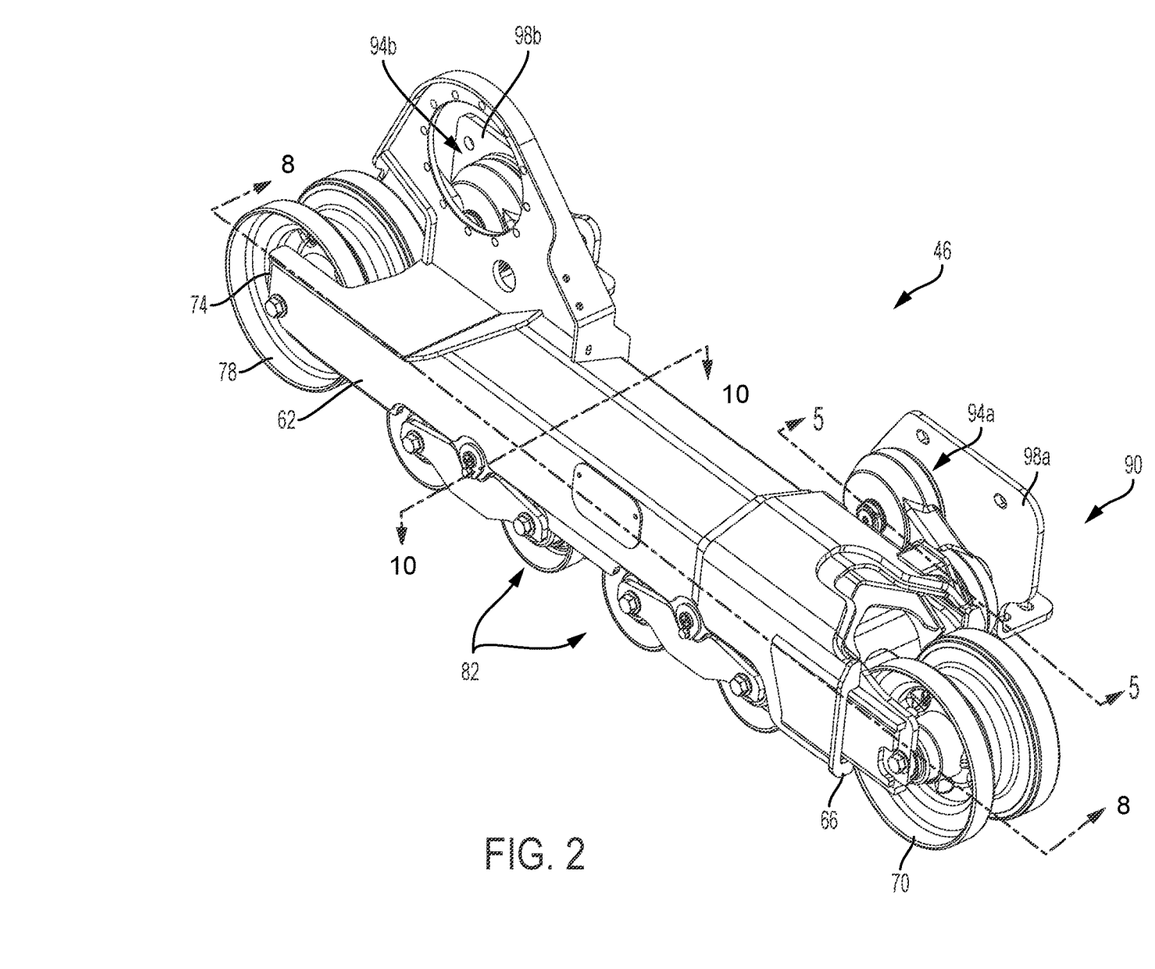
FIG. 2 is a perspective view of an undercarriage frame of the work vehicle of FIG. 1.

As shown in FIG. 2, the undercarriage frame 46 includes an elongated member 62 including a first end 66 supporting a first idler roller 70 and a second end 74 supporting a second roller 78. In addition, auxiliary rollers or bogies 82 are aligned between the first idler roller 70 and the second roller 78. In some embodiments, the first roller 70 is movable relative to the elongated member 62 (e.g., by a linear actuator or hydraulic cylinder—not shown) in order to apply tension on the track 50 (FIG. 1) and to remove tension from the track 50 for maintenance purposes.

Figure 3:
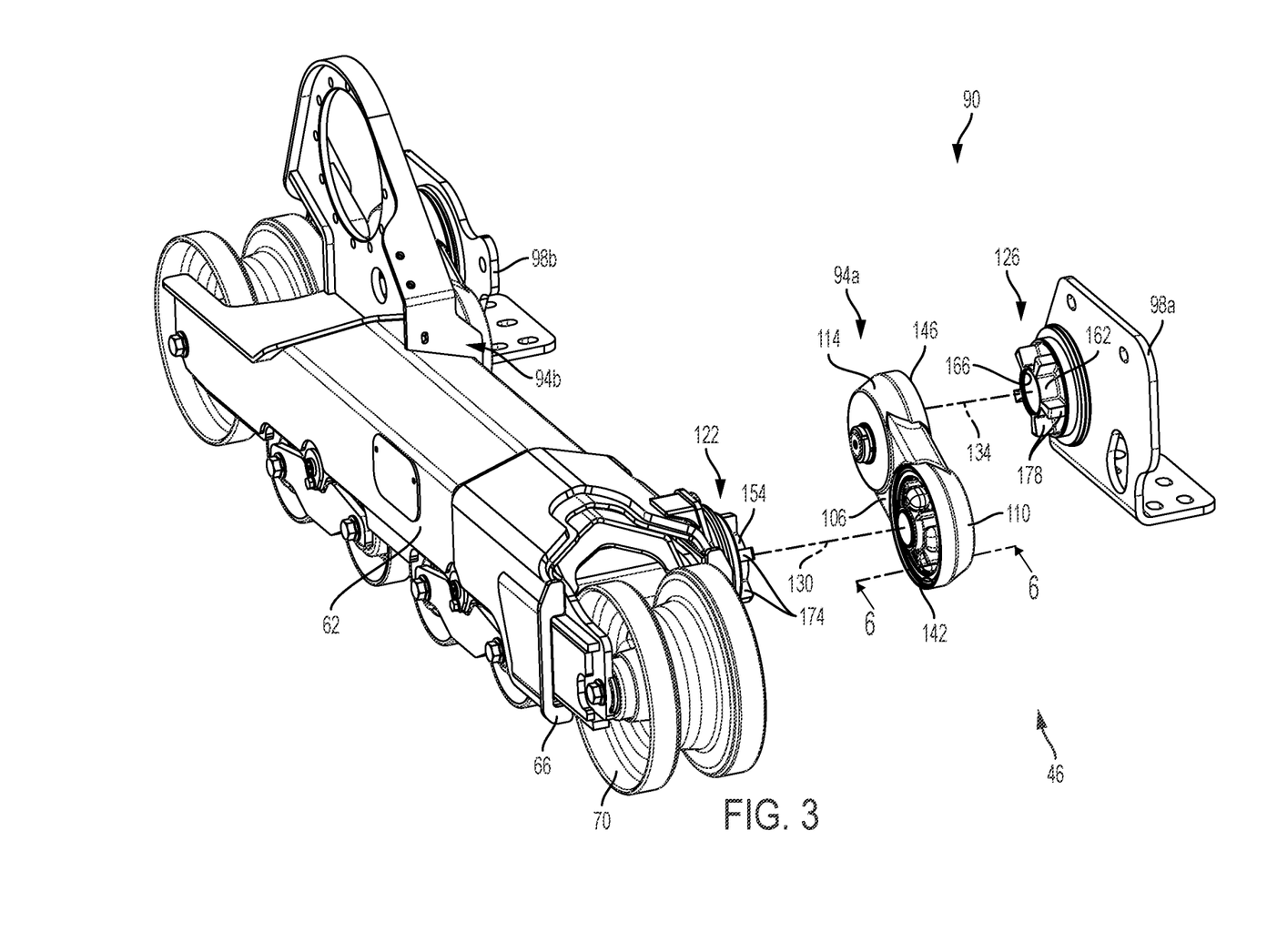
FIG. 3 is an exploded view of a portion of the undercarriage frame of FIG. 2.

As shown in FIGS. 2 and 3, a suspension system 90 supports the undercarriage frame 46 for movement relative to the chassis 14 (FIG. 1). In the illustrated embodiment, the suspension system 90 includes a two suspension members 94, and each suspension member 94 is coupled between the undercarriage frame 46 and a bracket 98 connected to the chassis 14. One suspension member 94a is coupled to the elongated member 62 proximate the first end 66, and the other suspension member 94b is coupled to the elongated member 62 proximate the second end 74. In other embodiments, the suspension system 90 may include fewer or more suspension members 94. Also, it will be understood that a crawler mechanism 18 on an opposite side of the chassis 14 includes a similar undercarriage frame 46 and suspension system 90. For the sake of brevity, only the components of one suspension member 94a will be described in detail, although it will be understood that other suspension members 94 include a similar structure.

As shown in FIG. 3, each suspension member includes a link 106. The link 106 includes a first end 110 and a second end 114. The first end 110 is pivotably coupled to a frame axle member 122 connected to the elongated member 62, and the second end 114 is pivotably coupled to a chassis axle member 126 on the bracket 98a. The first end 110 is pivotable relative to the frame axle member 122 about a first axis 130, and the second end 114 is pivotable relative to the chassis axle member 126 about a second axis 134. In the illustrated embodiment, the first end 110 of the link 106 is formed as a first lobe enclosing a first chamber 142 adjacent one side of the link 106, and the second end 114 of the link 106 is formed as a second lobe enclosing a second chamber 146 on another side of the link opposite the one side.

Each axle member includes a cylindrical wall and an opening. In particular, the frame axle member 122 includes a cylindrical wall 154 and an opening 158 (FIG. 4) aligned with the first axis 130. Peripheral shafts 170 extend radially outwardly from the cylindrical wall 154 of the frame axle member 122. Similarly, the chassis axle member 126 includes a cylindrical wall 162 and an opening 166 aligned with the second axis 134, and peripheral shafts 178 extend radially outwardly from the cylindrical wall 162 of the chassis axle member 126. In the illustrated embodiment, each axle member 122, 126 includes five peripheral shafts 174, 178, respectively, spaced apart about the associated cylindrical wall 154, 162 at equal angular intervals. In other embodiments, each axle member may include fewer or more peripheral shafts, and the shafts may be positioned in a different configuration. The configuration of the peripheral shafts may be different relative to each axle member.

Figure 4:
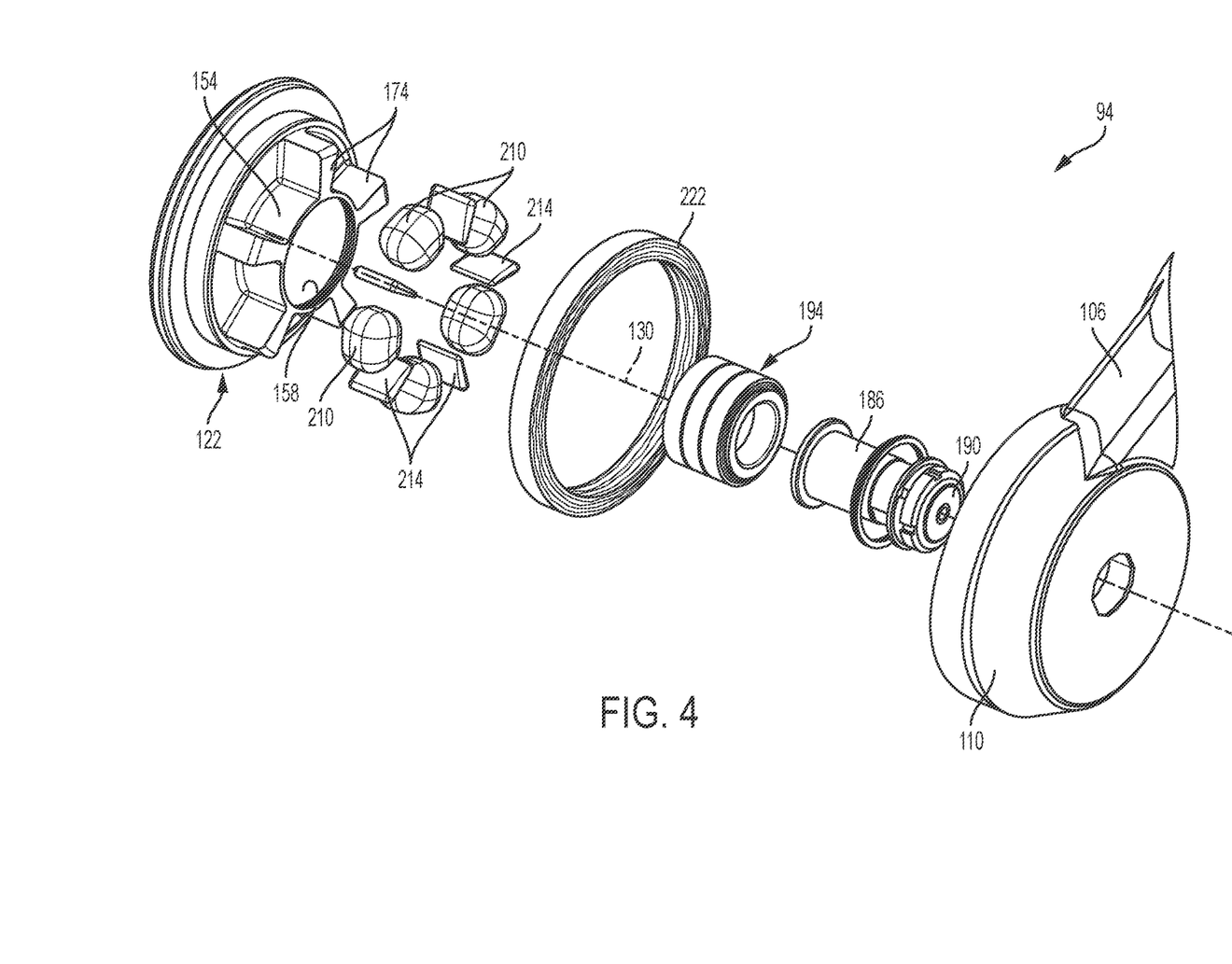
FIG. 4 is a partial exploded view of a suspension member.
Figure 5:
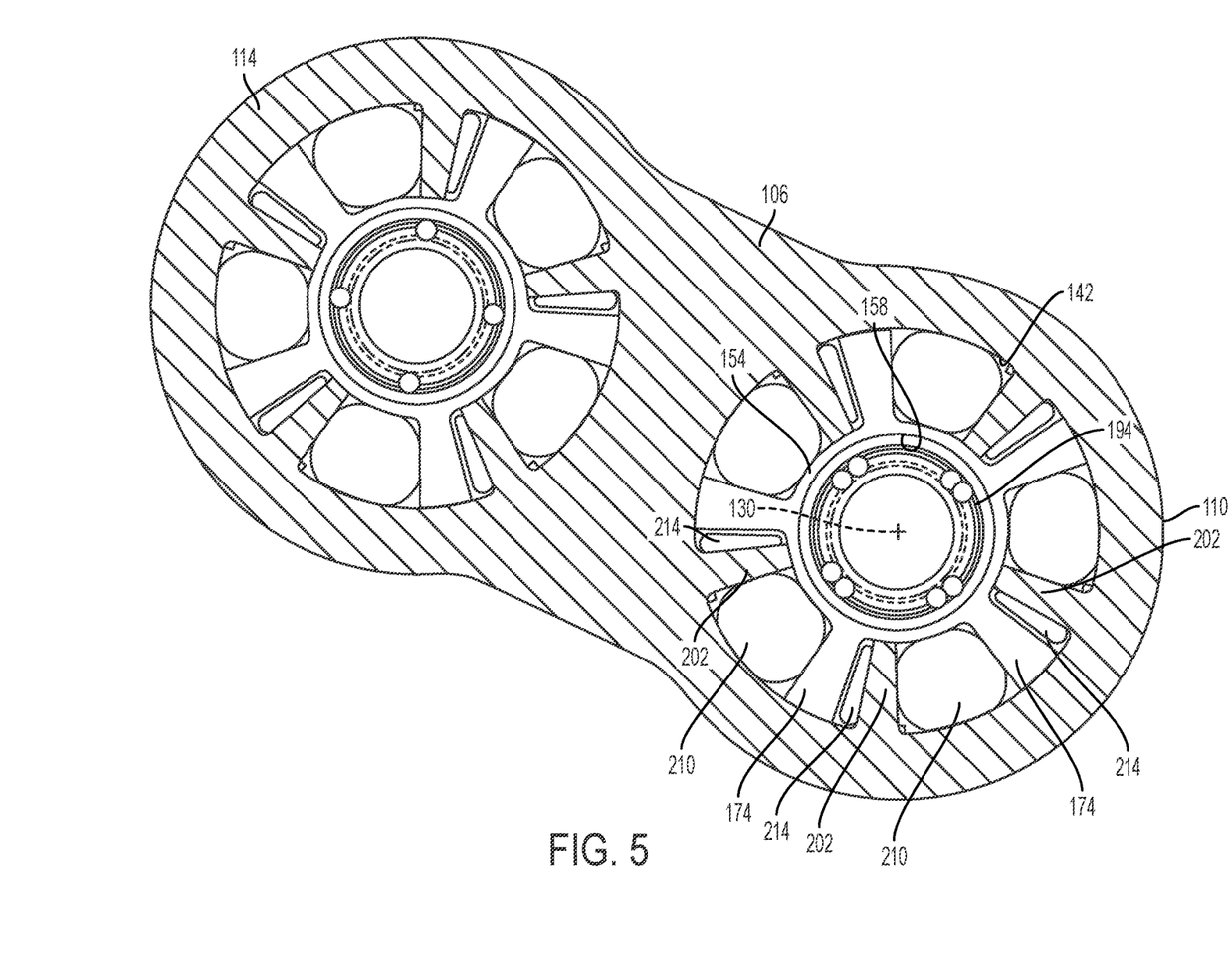
FIG. 5 is a section view of a portion of the undercarriage frame of FIG. 2, viewed along section 5-5.

Referring to FIGS. 4 and 5, a shaft 186 is positioned within the opening 158 of the cylindrical wall 154 of the frame axle member 122, and one end 190 of the shaft 186 is coupled to the first end 110 of the link 106 (e.g., by a bolt or other fastener). The shaft 186 is supported for rotation relative to the cylindrical wall 154 by bearings 194 (e.g., tapered roller bearings). As shown in FIG. 5, the first chamber 142 of the link 106 includes projections 202 that extend radially inwardly toward the cylindrical wall 154. An inner end of each projection 202 is positioned adjacent the cylindrical wall 154, thereby forming peripheral chambers bounded between the projections 202, the outer surface of the cylindrical wall 154, and an inner surface of the first chamber 142. Each peripheral shaft 174 is positioned in one of the peripheral chambers. Stated another way, each peripheral shaft 174 is positioned between two projections 202.

As shown in FIGS. 4 and 5, the suspension member 94 further includes buffers or resilient members for damping relative movement of the peripheral shafts and the projections. The resilient members include first resilient members 210 and second resilient members 214. Each first resilient member 210 is positioned between a first side of one of the peripheral shafts 174 and the associated projection 202 proximate the first side of the peripheral shaft 174. Each second resilient member 214 is positioned between a second side of one of the peripheral shafts 174 and the associated projection 202 proximate the second side of the peripheral shaft 174. As a result, the first resilient members 210 damp relative rotation of the link 106 and undercarriage frame 46 in a first direction about the first axis 130, while the second resilient members 214 damp relative rotation of the link 106 and the undercarriage frame 46 in a second, opposite direction.

Figure 7:
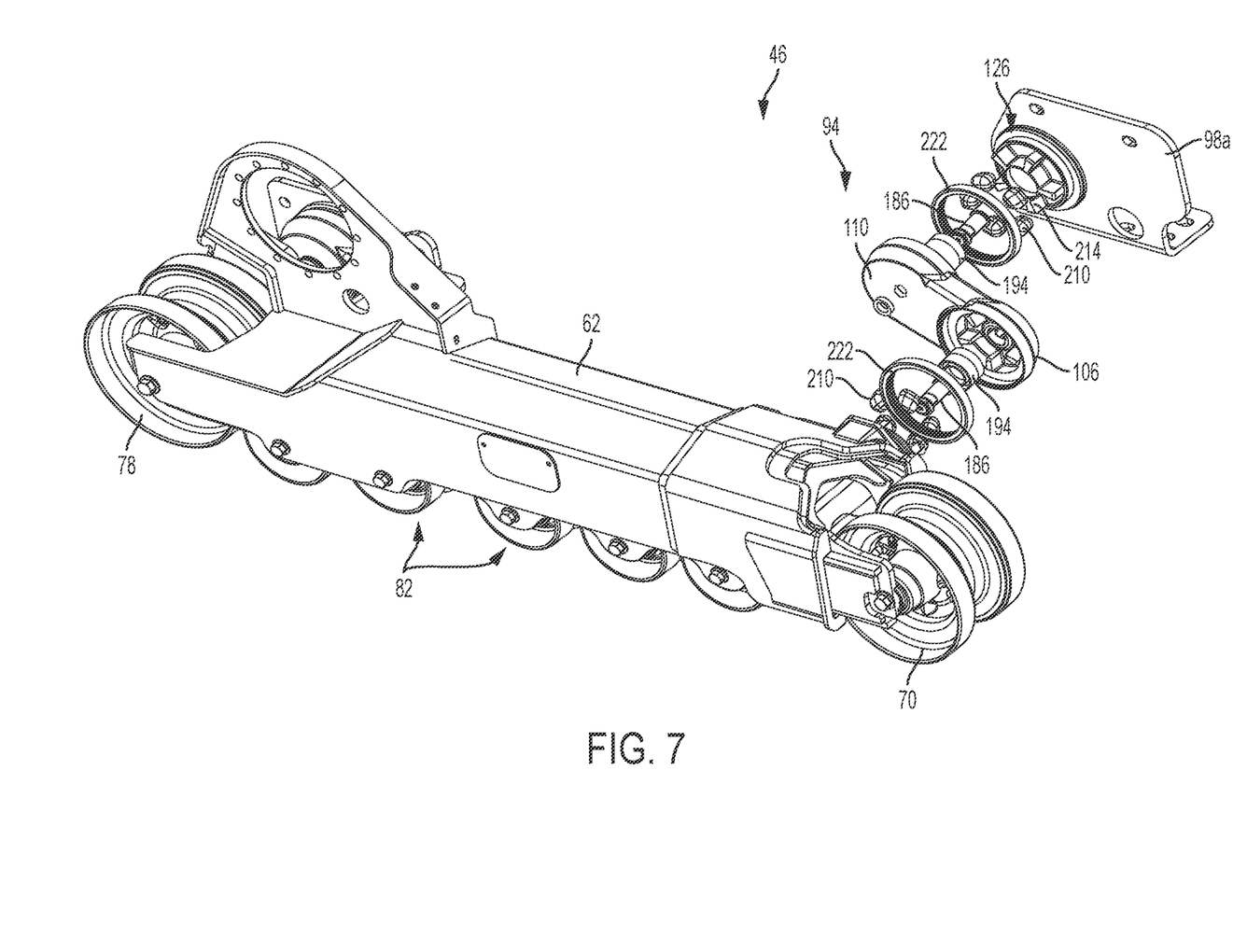
FIG. 7 is an exploded view of a portion of the undercarriage frame of FIG. 2.

In the illustrated embodiment, the first resilient members 210 are larger than the second resilient members 214 (i.e., the first resilient members 210 extend through a larger angle about the first axis 130 than the second resilient members 214), thereby providing more damping against relative movement in the first direction than in the second direction. In the illustrated embodiment, the second resilient members 214 are formed as thin flat members. As shown in FIG. 7, similar resilient members are provided between the chassis axle member and the second end of the link.

Figure 6:
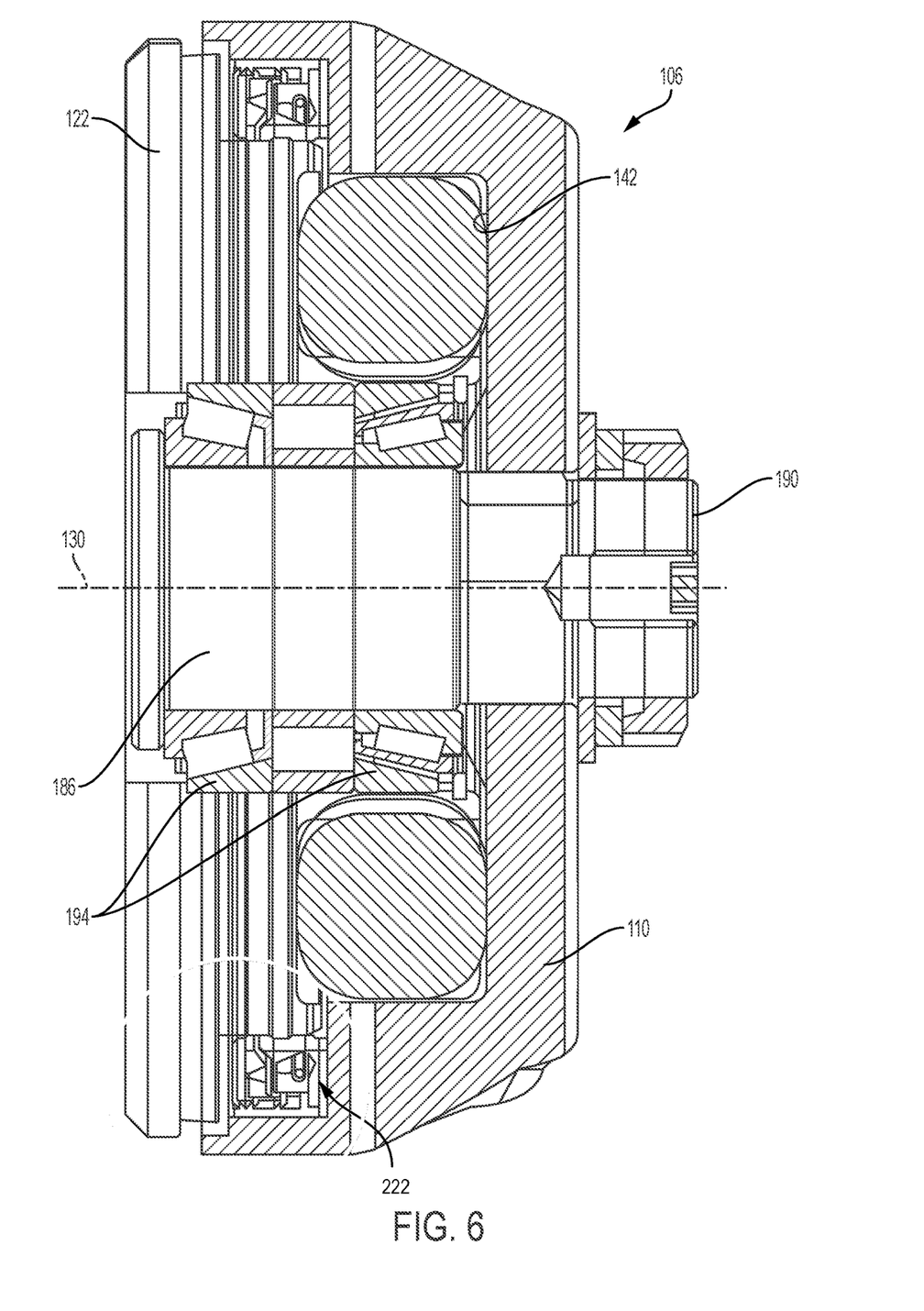
FIG. 6 is a section view of a portion of the undercarriage frame of FIG. 3, viewed along section 6-6.

Referring now to FIGS. 4 and 6, the suspension member 94 further includes a seal 222 positioned at an interface between the first end 110 of the link 106 and the frame axle member 122. In the illustrated embodiment, the seal 222 is a cassette seal extending around the frame axle member 122 to seal the first chamber 142. A similar seal may be positioned between the second end 114 of the link 106 and the chassis axle member 126 (FIG. 3). In other embodiments, the seal 222 may be a different type of seal (e.g., a lip seal, a metal face seal, an O-ring, or others).

Figure 8:
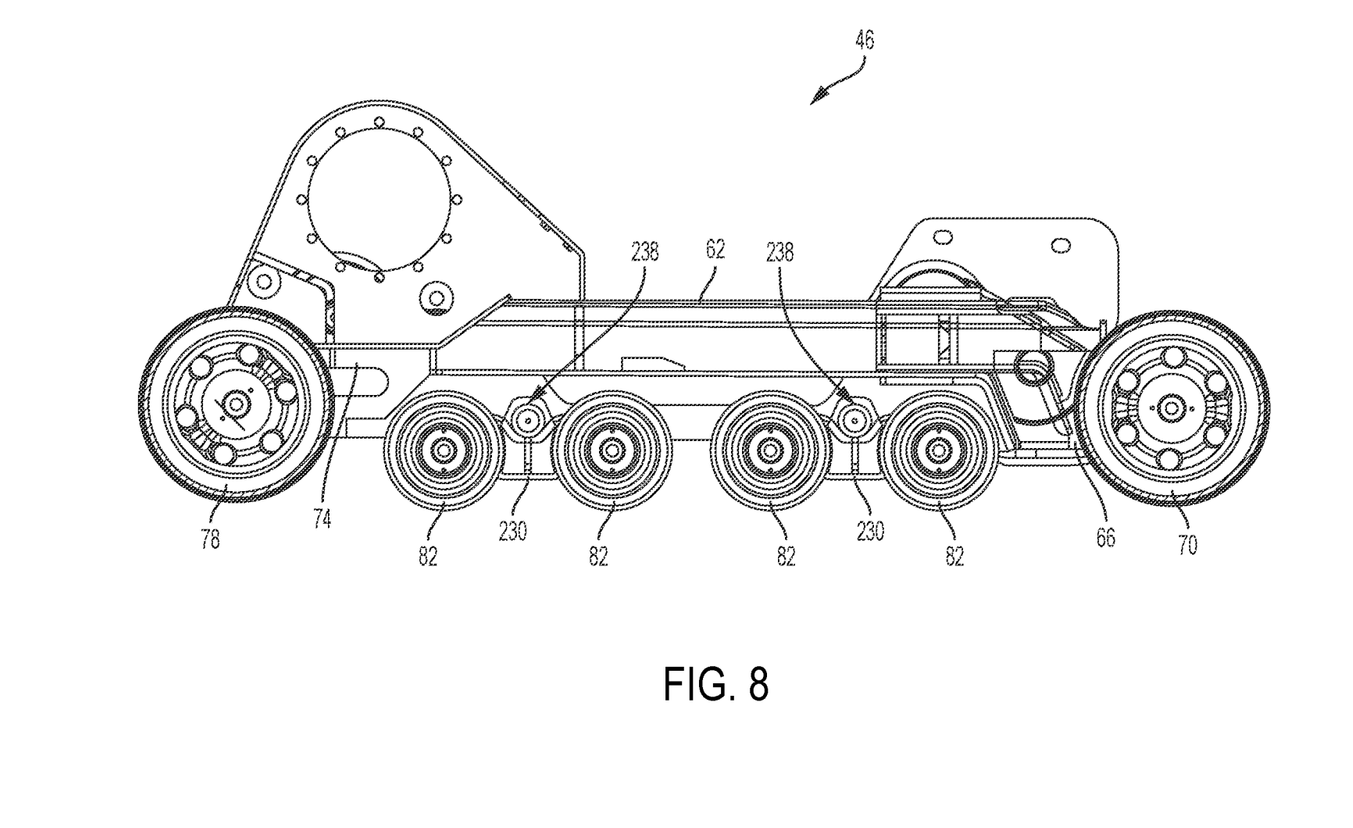
FIG. 8 is a section view of the undercarriage frame of FIG. 2, viewed along section 8-8.
Figure 9:
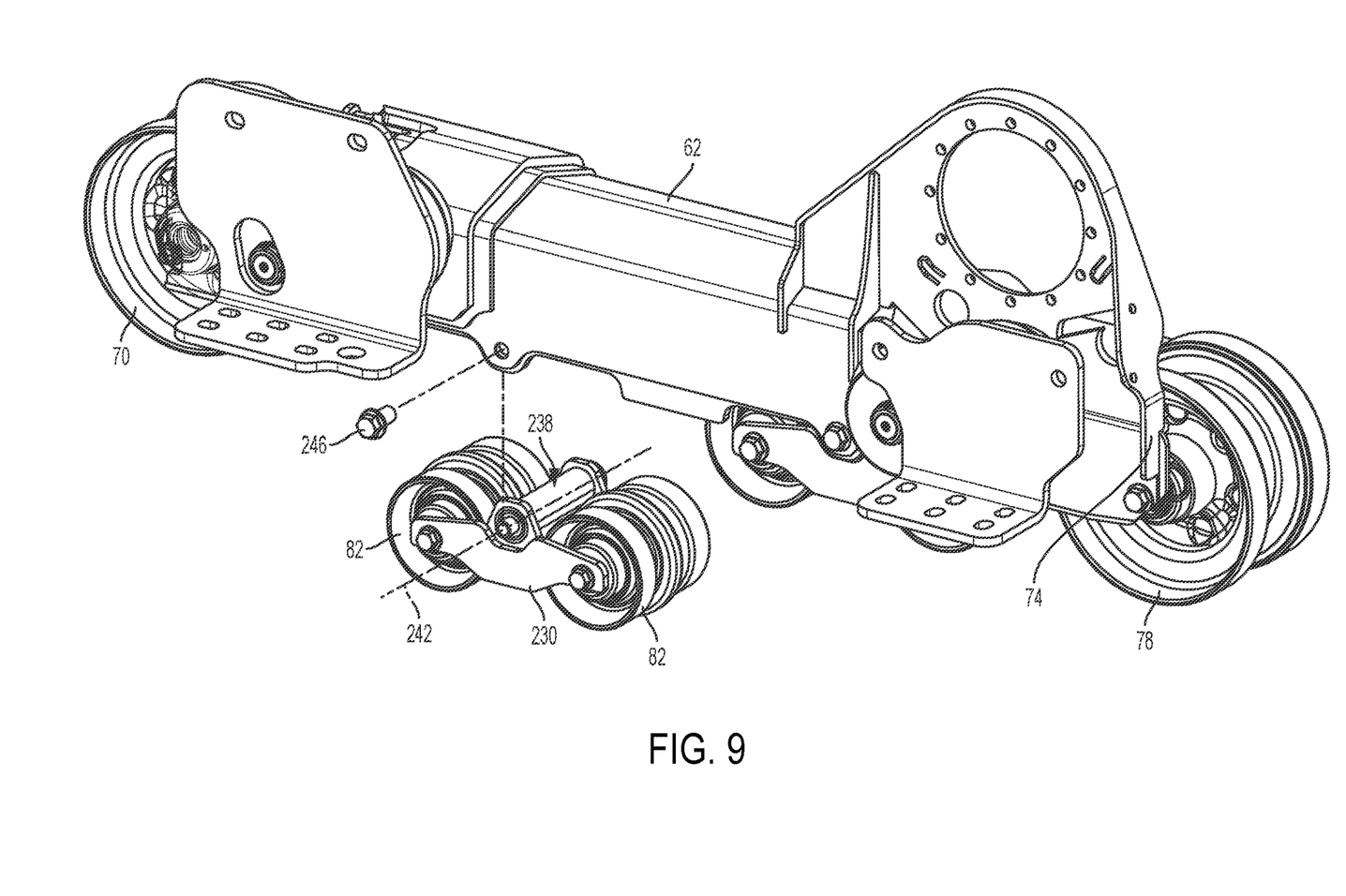
FIG. 9 is a partially exploded view of the undercarriage frame of FIG. 2.

As shown in FIGS. 8 and 9, the bogies 82 are aligned between the first end 66 and the second end 74 of the undercarriage frame 46. In the illustrated embodiment, two pairs of bogies 82 are coupled to the elongated member 62. Each pair of bogies 82 is coupled to a common yoke 230, and the yoke 230 is pivotably coupled to the elongated member 62 by a journal shaft coupling 238. The journal shaft coupling 238 extends along a yoke axis 242 (FIG. 9), and the yoke 230 and pair of bogies 82 are pivotable relative to the elongated member 62 about the yoke axis 242. The journal shaft coupling 238 is coupled to the elongated member 62 (e.g., by a fastener 246—FIG. 9). In other embodiments, the undercarriage frame 46 may include fewer or more bogies 82, and/or each yoke 230 may support fewer or more bogies 82.

Figure 10:
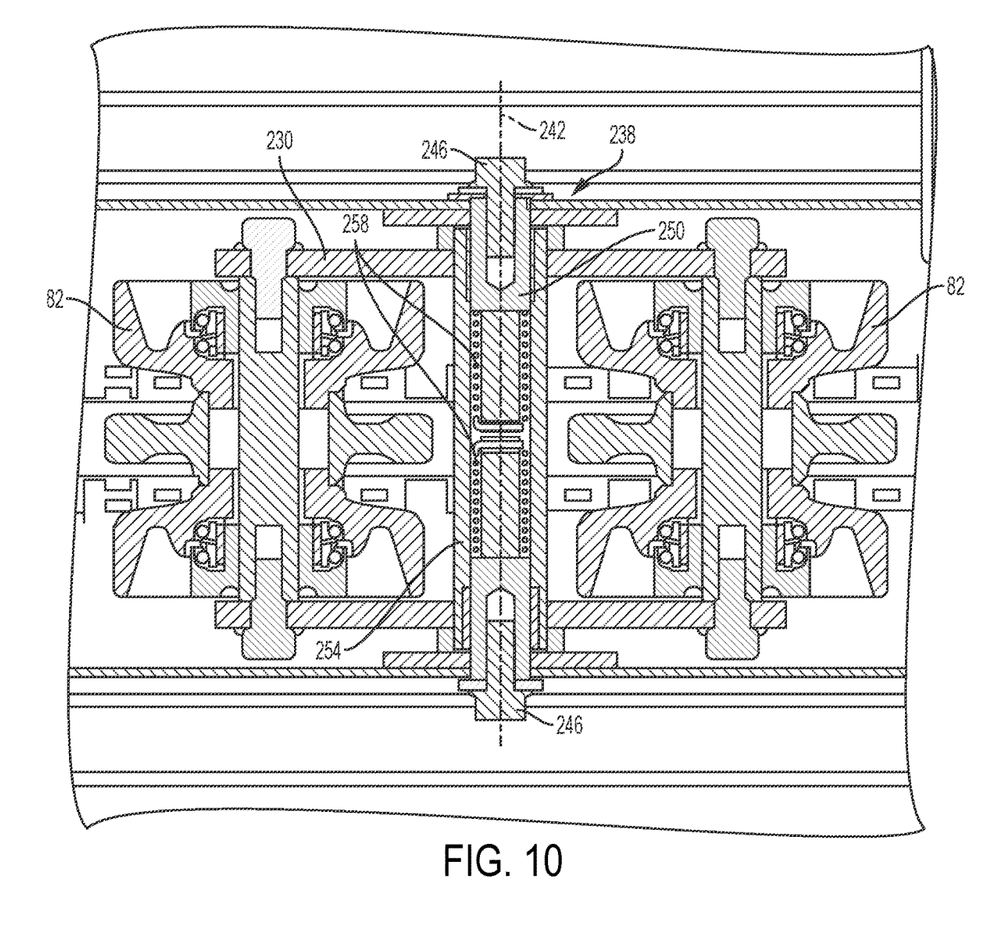
FIG. 10 is a section view of a portion of the undercarriage frame of FIG. 2, viewed along section 10-10.

In addition, as shown in FIG. 10, the journal shaft coupling 238 includes a shaft 250 positioned within a tube 254 that is coupled to the yoke 230. In some embodiments, torsion springs 258 bias the journal shaft 250 toward a predetermined orientation with respect to the yoke axis 242. The torsion springs 258 assist in damping high frequency oscillations.

Figure 11:
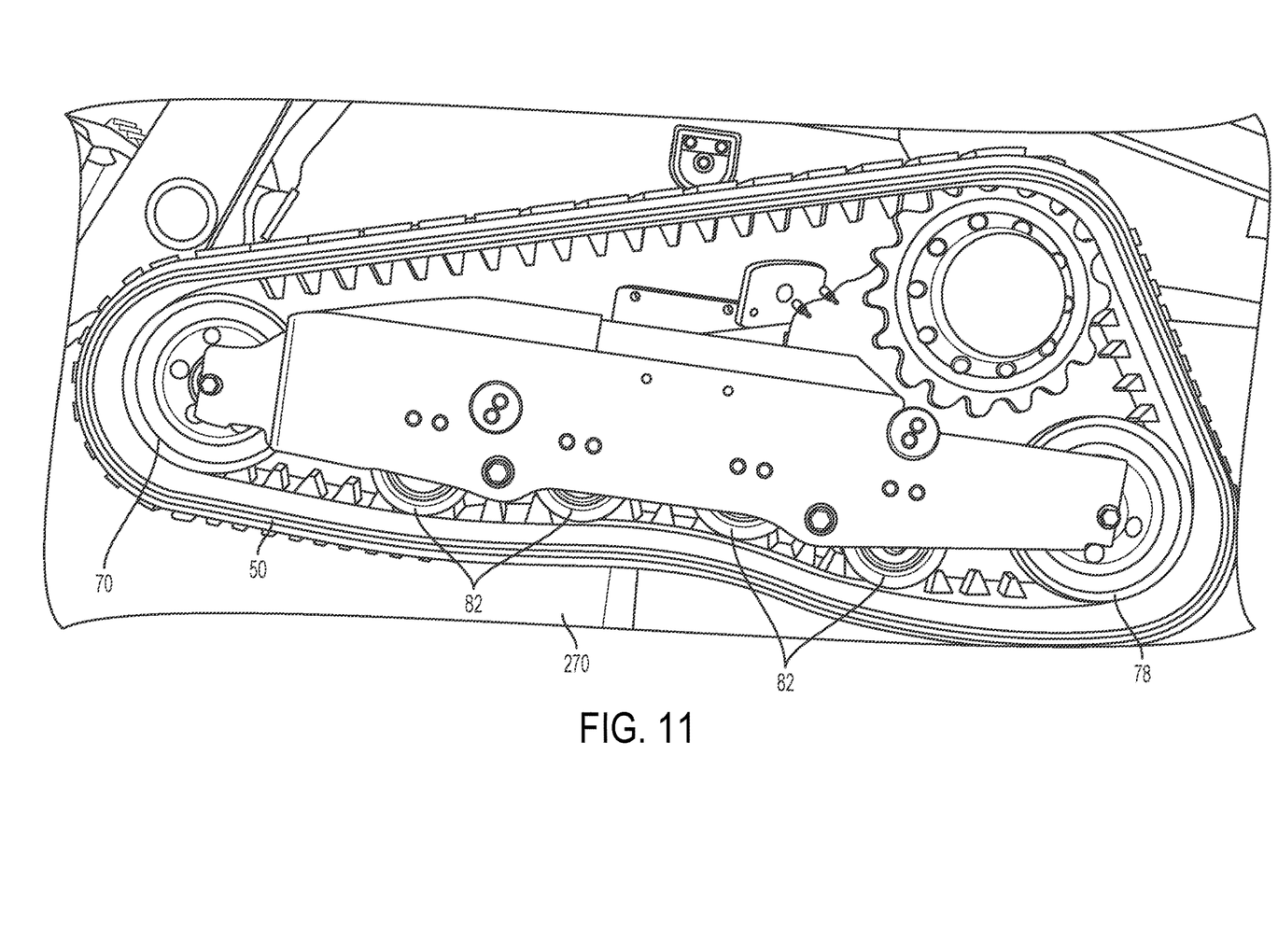
FIG. 11 is a side view of the undercarriage frame of FIG. 2.

As shown in FIG. 11, the pivoting movement of the bogies 82 assists in maintaining the track 50 in contact against the ground 270 as the track 50 travels over uneven ground. In addition, the bogies 82 maintain alignment of the track 50 as it travels between the first sprocket 70 and the second sprocket 78. The suspension system 90 provides torsional damping of the axle members 122, 126 (FIG. 4), thereby absorbing and damping low frequency, high magnitude (e.g., impact) loads and high frequency, low magnitude loads. The bogies 82 also assist in absorbing and damping high frequency, low magnitude loads, further improving overall ride quality.

Although certain aspects have been described in detail with reference to certain preferred embodiments, variations and modifications exist within the scope and spirit of one or more independent aspects as described. Various features and advantages are set forth in the following claims.

What is claimed is:

1. A suspension system for supporting a chassis relative to a crawler frame, the suspension system comprising:
    a link including a first portion and a second portion, the second portion configured to be coupled to the chassis, the link rotatable about an axis extending transversely through the first portion, the first portion including an inner surface, a plurality of projections extending radially inward from the inner surface, and a plurality of peripheral openings defined by spaces between the plurality of projections, the link further including a first side and a second side;
    an axle member extending at least partially through the first portion of the link from the first side of the link toward the second side, the axle member configured to be secured to the crawler frame, the axle member including a plurality of peripheral projections, each of the peripheral projections positioned in an associated one of the peripheral openings of the first portion, each of the peripheral projections extending radially outwardly with respect to the axis, rotation of the axle member relative to the link about the axis causing each peripheral projection to rotate about the axis within the associated peripheral opening;
    a shaft extending along the axis at least partially between the first portion and the axle member, the shaft including an end secured to the first portion;
    a bearing supporting the shaft for rotation about the axis relative to at least one of the link and the axle member;
    a seal extending along a perimeter of at least the first portion of the link to seal the plurality of peripheral openings;
    a plurality of resilient members, each of the resilient members positioned within an associated one of the peripheral openings and engaging an associated peripheral projection, each resilient member damping movement of the associated peripheral projection relative to the link about the axis in at least a first direction; and
    at least one auxiliary roller assembly configured to be coupled to the crawler frame, the auxiliary roller assembly including a yoke and a plurality of auxiliary rollers coupled to the yoke, the yoke configured to be rotatable relative to the crawler frame about a yoke axis, the plurality of auxiliary rollers aligned along a direction of travel of the track and configured to engage an inner surface of the track.

2. The suspension system of claim 1, wherein the auxiliary roller assembly further includes a torsional biasing member for biasing the yoke against rotation relative to the frame.

3. The suspension system of claim 1, wherein the auxiliary roller assembly is configured to be positioned between a first end and a second end of the crawler frame, the auxiliary roller configured to engage and bias the track against a ground surface.

4. The suspension system of claim 1, wherein the plurality of resilient members is a plurality of first resilient members, each of the first resilient members positioned adjacent a first side of the associated peripheral projection, and further comprising a plurality of second resilient members, each of the second resilient members positioned within an associated one of the openings and positioned adjacent a second side of the associated peripheral projection, each second resilient member damping movement of the associated peripheral projection relative to the link about the axis in a second direction opposite the first direction.

5. The suspension system of claim 4, wherein each first resilient member extends through a first angular range about the axis and each second resilient member extends through a second angular range about the axis that is smaller than the first angular range.

6. The suspension system of claim 1, wherein the seal is positioned on the first side of the link at an interface between the axle member and the link.

7. A work vehicle comprising:
a chassis supporting an operator cab and a work attachment;
a crawler mechanism for moving the chassis on a support surface, the crawler mechanism including a frame, a continuous track extending around the frame, and a drive sprocket for driving the track, the frame including a first end, a second end, and at least one idler roller engaging the track; and
a suspension system for supporting the chassis relative to the crawler mechanism, the suspension system including,
a link including a first portion and a second portion, the second portion coupled to the chassis, the link rotatable about an axis extending transversely through the first portion, the first portion including an inner surface, a plurality of projections extending radially inward from the inner surface, and a plurality of peripheral openings defined by spaces between the plurality of projections,
an axle member secured to the crawler frame, the axle member including a plurality of peripheral projections, each of the peripheral projections extending radially outward from the axis and positioned in an associated one of the peripheral openings of the first portion, rotation of the axle member relative to the link about the axis causing each peripheral projection to rotate about the axis within the associated peripheral opening, the axle member further including a central opening extending along the axis,
a plurality of resilient members, each of the resilient members positioned within an associated one of the peripheral openings and engaging an associated peripheral projection, each resilient member damping movement of the associated peripheral projection relative to the link about the axis in at least a first direction,
at least one auxiliary roller assembly coupled to the crawler frame between the first end and the second end, each auxiliary roller assembly including a yoke and a plurality of auxiliary rollers coupled to the yoke, the yoke rotatable relative to the crawler frame about a yoke axis, the plurality of auxiliary rollers aligned along a direction of travel of the track and engaging an inner surface of the track;
a shaft extending along the axis at least partially between the first portion and the axle member, the shaft secured to the first portion and positioned within the central opening; and
a bearing positioned in the central opening to support relative rotation between the shaft and the axle member.

8. The work vehicle of claim 7, wherein the auxiliary roller assembly further includes a torsional biasing member for biasing the yoke against rotation relative to the frame.

9. The work vehicle of claim 7, wherein the auxiliary roller assembly is rotatable relative to the crawler frame in response to variations in the ground, the auxiliary rollers biasing the track against a ground surface.

10. The work vehicle of claim 7, further comprising a roller bearing supporting the shaft for rotation about the axis relative to at least one of the link and the axle member.

11. The work vehicle of claim 7, wherein the plurality of resilient members is a plurality of first resilient members, each of the first resilient members positioned adjacent a first side of the associated peripheral projection, and further comprising a plurality of second resilient members, each of the second resilient members positioned within an associated one of the openings and positioned adjacent a second side of the associated peripheral projection, each second resilient member damping movement of the associated peripheral projection relative to the link about the axis in a second direction opposite the first direction.

12. The work vehicle of claim 11, wherein each first resilient member extends through a first angular range about the axis, wherein each second resilient member extends through a second angular range about the axis that is smaller than the first angular range.

13. The work vehicle of claim 7, further comprising a seal extending along a perimeter of at least the first portion of the link at an interface between the axle member and the first portion to seal the peripheral openings.

* * * * *